Patented Aug. 29, 1933

1,924,238

UNITED STATES PATENT OFFICE 1,924,238

CELLULOSE SOLUTION AND CELLULOSE DERIVATIVE AND PROCESS OF MAKING SAME

Charles Graenacher, Basel, Switzerland, assignor to Society of Chemical Industry in Basle, Basel, Switzerland No Drawing. Application September 17, 1931, Serial No. 563,465, and in Switzerland September 27, 1930

14 Claims. (Cl. 260—101)

This invention relates to new cellulose solutions and the application thereof for making various products chemically or mechanically, and to these products themselves.

The invention is based on the observation that the liquified quaternary ammonium salts by themselves or in presence of suitable liquids have the surprising property of dissolving cellulose with the formation of solutions of more or less viscosity. Such liquids are anhydrous nitrogen-containing bases, such as anhydrous ammonia, or organic bases which do not decompose the quaternary ammonium salts, such as alkylamines (for example mono-, di- or trimethylamine), aniline, monomethylaniline, dimethylaniline, pyridine, picoline, lutidine, technical pyridine bases, mixtures of these compounds, etc.

Among the ammonium salts the halides, such as the chlorides, bromides, and iodides are the most suitable. There may also be used other salts, such as for example sulfates, nitrates, or organic salts, such as formiates, acetates etc. Among the ammonium salts particularly those are further suitable which are obtained by addition of halogen hydracid esters which contain up to 8 carbon atoms, such as benzyl chloride, chlorobenzyl chloride, ethyl, propyl or butyl chloride, or also from hexyl halides and octyl halides to pyridine or a technical mixture of tertiary pyridine bases. Useful results may however also be obtained with other halides, such as for example with esters of halogen containing fatty acid, such as chloracetic ester or unsaturated products, such as allyl halides. The cellulose can be separated again from such solutions by means of suitable precipitating agents, so that, according to the selected conditions, artificial threads, films, artificial masses or the like can be obtained.

The new cellulose solutions contain the cellulose in a very reactive form. They are, therefore, suitable for various chemical reactions, especially such reactions in which the hydrogen atom of the OH-group of the cellulose is substituted, i. e. esterified or etherified. In particular they react very easily with acid anhydrides and acid chlorides, and quite generally with compounds which may react with the cellulose and which do not yield with pyridine addition products stable against water. Such products are not only organic acid anhydrides and acid halides, but also etherifying agents, such as triphenyl-methylchloride or dimethyl sulfate.

The cellulose derivatives thus obtained, provided that they have not already been precipitated in the course of the reaction, can be separated from the solution by means of suitable precipitating agents, so that these solutions also can be used under suitable conditions for producing artificial threads, films, artificial masses or the like.

Thus it has for the first time become possible to produce molded articles from cellulose derivatives which are insoluble even in the usual solvents for such cellulose derivatives (e. g. aceton, chloroform, glacial acetic acid, acetic ester, benzene, tetrachlorethane, etc.). By mixing the solutions obtainable according to the examples mentioned hereafter, also homogeneous molded articles consisting of mixtures of cellulose and cellulose derivatives (e. g. acidyl cellulose) may be produced.

The solutions of cellulose or its conversion products obtained according to the invention can be preserved for an unlimited time. The solutions can also be mixed in certain cases, if necessary, with suitable anhydrous diluents or other suitable additions. As such additions may be named, for example, substances having a reducing action, as, for instance, para-formaldehyde, glucose, lactose and the like; other suitable additions are substances, such as starch, dextrin and the like.

The following examples illustrate the invention, the parts being by weight:—

Example 1

200 parts of anhydrous benzyl-pyridinium chloride are melted in a stirring vessel and heated to 110–115° C. At this temperature 10 parts of cellulose (preferably in the form of regenerated cellulose) are stirred in and the mixture is kept at the same temperature, with continuous stirring, until a homogeneous mixture is produced.

Example 2

100 parts of benzylpyridinium-chloride are mixed at 110–115° C. with 20 parts of pyridine and to the homogeneous solution are added 6 parts of cellulose (preferably in the form of regenerated cellulose). Whilst continuously stirring, the mixture is kept at 115° C., whereby the cellulose dissolves the formation of a viscous liquid.

Example 3

100 parts of dry pyridine, 60 parts of benzylchloride and 11.2 parts of dry cellulose (preferably in the form of regenerated cellulose), are charged into a stirring vessel and the mixture is stirred and heated until the temperature rises, without further application of heat. Care is taken by cooling that the temperature does not exceed 115° C. Together with the formation of benzylpyridinium chloride the cellulose swells strongly. When no further spontaneous production of heat occurs, the mixture is maintained with continuous stirring at 115° C. Whereby, according to the kind of cellulose used, the latter, after a period of some minutes up to several hours, is dispersed to form a highly viscous reddish-brown liquid. Instead of the pyridine another tertiary base or mixture of such bases may be used, for instance a mixture of 75 parts of pyridine and 25 parts of picoline. By spinning the solution obtained, for instance in water, dilute acid or alcohol, cellulose threads of particular tenacity are obtained.

Example 4

8 parts of dry bleached cellulose are introduced into a mixture of allyl-pyridinium chloride and pyridine which can be obtained by heating 50 parts of allyl chloride and 100 parts of pyridine in a reflux apparatus on a water-bath until the formation of the pyrodinium compound is completed. The mixture is stirred at 105–110° C. until the cellulose has passed completely into solution. There is thus produced a viscous solution from which, when poured into water, cellulose is precipitated in coherent form.

Example 5

100 parts of ethyl-pyridinium chloride are dissolved in 50 parts of pyridine, 7.5 parts of dry linters are introduced into the clear solution at 90–95° C. and the mixture is stirred at this temperature. The cellulose quickly becomes swollen and forms a viscous mass which on further stirring passes into the form of a highly viscous, completely clear solution which is well adapted for being spun. The properties of the spun material may be improved by incorporating in the cellulose during the dissolving process additions, such as para-formaldehyde, glucose, lactose, starch, dextrin or the like. The viscosity of the cellulose solution may be diminished as desired by raising the temperature at which dissolution occurs, or by prolonged heating of the mixture. Cellulose solutions are also obtained by substituting 32 parts of aniline or 37 parts of methylaniline for the 50 parts of pyridine.

Example 6

75 parts of monochloracetic acid ethyl ester and 100 parts of pyridine are heated whilst stirring to 90–100° C. until the formation of the pyridinium-chloracetic acid ethyl ester is completed; when reaction commences, care is taken to cool the mixture so that its temperature does not rise substantially above the aforesaid value.

10 parts of finely comminuted dry cellulose regenerated from viscose are introduced into the yellow solution of pyridinium chloracetic acid ethyl ester in pyridine thus obtained, and the whole is stirred at 105–110° C. until the cellulose is completely dissolved; this operation requires about one-half to one hour. There is thus obtained a brown viscous solution of cellulose which can be spun in water to threads which are scarcely coloured.

Example 7

To a cellulose solution of 5 per cent strength, made as described in Example 3, are added, after cooling the solution to about 80° C. 3½ molecular proportions (calculated on the cellulose) of acetic anhydride. After a short time the temperature rises gradually; preferably it is not allowed to rise above 90° C.

While continuously stirring, the temperature of the mixture is kept for 1 hour at 80–90° C., and the mixture is then poured into water and the separated acetyl cellulose washed with water and alcohol.

The product obtained is completely soluble in tetrachlorethane. It may be used for making films, threads, artificial masses and the like.

If a cellulose solution is used for the acetylation in the above described manner made according to the particulars of Example 5, there is obtained an acidyl cellulose solution from which an acetyl cellulose may be separated, which is insoluble in all usual solvents for acidyl cellulose. This property, of course, is retained by the threads, films, and other molded articles which have been produced from this solution. Similar results are obtained by mixing the acetyl cellulose solution with the cellulose solution of Example 5.

Example 8

To a solution of cellulose of 5 per cent strength made as described in Example 3 there are added at 90° C. a quantity of butyric anhydride corresponding with 3½ molecular proportions (calculated on the cellulose). The mixture is heated, while continuously stirring, for 4 hours at 90–95° C. and then poured into alcohol. The butyryl cellulose separates in the form of a fine powder, which is filtered by suction and boiled with alcohol for purification. The product is soluble in tetrachlorethane and in pyridine to a clear solution and forms a highly viscous solution.

Example 9

A mixture of 1200 parts of dry pyridine and 700 parts of benzylchloride is heated, while stirring, to 85–90° C. and, if necessary by cooling, the spontaneous heating of the mixture is so controlled that the temperature does not rise above 95° C. until the formation of the benzylpyridinium chloride is finished and a clear solution is produced.

Into the pyridine solution of the benzylpyridinium chloride thus produced are introduced 100 parts of finely subdivided regenerater cellulose and the mixture is stirred, while the temperature rises to 110° C., until a homogeneous cellulose solution is produced.

Into this solution, cooled to 90° C. are run 320 parts of fused benzoic acid anhydride and the whole is stirred for 2–3 hours at 90–100° C. There is formed a brownish, homogeneous solution capable of being drawn into threads. This solution is poured into methylalcohol, and then the separated benzoyl-cellulose is extracted with methylalcohol. The benzoyl cellulose thus obtained differs in solubility according to the kind of cellulose used; the solubility is increased by prolonged heating of the product in the solution in which the reaction occurred. From the benzoyl-cellulose thus obtained there may be made clear elastic films which are not brittle. Excellent threads may also be obtained by spinning the product.

Example 10

Into a solution of 8 parts of cellulose in 160 parts of a mixture of benzylpyridinium chloride and pyridine, made as described in Example 9, are introduced at 70° C., 22 parts of benzoylchloride. The mixture is heated spontaneously and care is taken, by a suitable cooling, that the temperature does not rise above 90° C. After the reaction has proceeded for ½ hour, the mass is poured into methylalcohol and the pulverulent benzoyl-cellulose which separates is filtered by suction and extracted with methylalcohol.

The pure white benzoyl-cellulose thus obtained is characterized by its solubility, being freely soluble in benzene, chloroform, tetrachlorethane and glacial acetic acid.

*Example 11*

Into a solution of 8 parts of cellulose in 160 parts of a mixture of benzylpyridinium chloride and pyridine, made as described in Example 9, are introduced at 100° C. 5.2 parts of acetic anhydride, and after the reaction has proceeded for ½ hour and the solution has cooled to 80° C., 14 parts of benzoyl chloride are further introduced. After the reaction has proceeded for another ½ hour, the product is poured into acqueous alcohol and worked up as described in the preceding examples.

The acetylbenzoylcellulose thus obtained is soluble in pyridine and in a mixture of tetrachlorethane and alcohol and forms a highly viscous solution.

*Example 12*

Into a solution of 8 parts of cellulose in 160 parts of a mixture of benzylpyridinium chloride and pyridine, made as described in Example 9, there are introduced at 100° C. 20 parts of phthalic acid anhydride, and the mixture is stirred for 1 hour at 100–105° C. The light yellow-brown mass thus obtained is poured into 1 litre of water containing 5 per cent of pyridine, whereby the product which at first separates becomes completely dissolved. By acidifying the solution cellulose phthalic acid ester is precipitated in the form of a feebly yellowish flocculent mass, which is filtered by suction and washed with water. After it has been dried it is extracted with acetone. The cellulose phthalic acid ester which remains undissolved is an easily pulverized mass, which dissolves easily in weak alkalies, such as sodium carbonate or dilute ammonia, with formation of moderately viscous solutions, which are clear. The dried product is insoluble in organic solvents, such as acetone, alcohol, tetrachlorethane or benzene. It is freely soluble in acqueous pyridine.

*Example 13*

Into a solution of 8 parts of cellulose in 160 parts of a mixture of benzylpyridinium chloride and pyridine, made as described in Example 9, are introduced at 110° C., 20 parts of well dried isatoic acid anhydride and the mixture is stirred at the said temperature for 20 hours. The mixture is then poured into much water. The product separates in the form of a slowly solidifying yellowish mass, which is comminuted and dissolved in cold sulphuric acid of 5–10 per cent strength. The solution, which may be filtered, if necessary, is then made alkaline with sodium carbonate, whereupon the cellulose anthranilic ester separates in the form of a swollen pulverulent mass, which is filtered, washed with water and dried.

The ester thus obtained is insoluble in organic solvents but dissolves in dilute acqueous mineral acids to solutions which are opaque and foam strongly. Such solutions can be diazotized and coupled with suitable components for producing azo-dyestuffs.

The benzylpyridinium compound used in Examples 7, 8, 9, 10, 11, 12, and 13 can be replaced by other ammonium compounds indicated or intimated in the introduction or in the other examples. Further, the pyridine serving as a solvent or liquifying agent can be replaced by other liquid tertiary bases.

*Example 14*

Into a solution of 8 parts of cellulose in 160 parts of a mixture of benzylpyridinium chloride and pyridine, made as described in Example 9, are introduced, at 90° C., 20 parts of dry triphenylchloromethane and the mixture is stirred at 90–100° C. After the reaction has proceeded for 1½ hours the cellulose solution is poured into methyl alcohol, whereupon the cellulose ether separates first as a soft fibrous mass, which soon becomes hard and brittle. It is coarsely pulverized, extracted with methyl alcohol and dried.

The cellulose-triphenylmethyl ether thus obtained is a pure white brittle mass which dissolves in pyridine but is sparingly soluble in chloroform.

It will be understood that the esterfication of the cellulose by means of the acylating agents named in Examples 9—14 may also be conducted in like manner with the use of the solutions of cellulose described in Examples 4—6.

Quite generally, it is recommended that the operations for making the cellulose solutions and cellulose derivatives be conducted with the exclusion of air or in presence of an inert gas.

In all these examples it is indifferent whether the pyridine used as solvent is in the form of a pure or in the form of a dry technical pyridine.

What I claim is:—

1. Process for the production of cellulose esters, consisting in treating solutions of cellulose in liquid solutions of quaternary ammonium salts obtained by addition of a halogen hydracid ester of an alcohol containing not more than 8 carbon atoms to a tertiary amine of the pyridine series, with acylating agents.

2. Process for the production of cellulose esters, consisting in treating solutions of cellulose in liquid solutions of quaternary ammonium salts obtained by addition of a halogen hydracid ester of an alcohol containing not more than 8 carbon atoms to pyridine or a technical mixture of tertiary pyridine bases, with acylating agents.

3. Process for the production of cellulose esters, consisting in treating with an acylating agent selected from the group consisting of the halides and anhydrides of organic carboxylic acids solutions of cellulose in liquid solutions of tertiary bases of the pyridine series and quaternary ammonium halides by addition of a halogen hydracid ester of an alcohol containing not more than 8 carbon atoms to a base of the pyridine series.

4. Process for the production of cellulose esters, consisting in treating with anhydrides of organic carboxylic acids solutions of cellulose in liquid solutions of tertiary bases of the pyridine series and quaternary ammonium halides obtained by addition of a halogen hydracid ester of an alcohol containing not more than 8 carbon atoms to a base of the pyridine series.

5. Process for the production of acyl derivatives of cellulose, consisting in treating with acetic anhydride solutions of cellulose in liquid solutions of tetiary bases of the pyridines series and quaternary ammonium halides obtained by addition of a halogen hydracid ester of an alcohol containing not more than 8 carbon atoms to a tertiary base of the pyridine series.

6. Process for the production of acyl derivatives of cellulose, consisting in treating with butyric acid anhydride solutions of cellulose in liquid solutions of tertiary bases of the pyridine series and quaternary ammonium halides obtained by addition of a halogen hydracid ester of an alcohol containing not more than 8 carbon atoms to a tertiary base of the pyridine series.

7. Process for the production of acyl derivatives of cellulose, consisting in treating with benzoic acid anhydride solutions of cellulose in liquid solutions of tertiary bases of the pyridine series and quaternary ammonium halides obtained by addition of a halogen hydracid ester of an alcohol containing not more than 8 carbon atoms to a tertiary base of the pyridine series.

8. A composition of matter consisting of solutions of cellulose esters in mixtures of tertiary bases and quaternary ammonium salts obtained by addition of a halogen hydracid ester of an alcohol containing not more than 8 carbon atoms to a tertiary base of the pyridine series.

9. A composition of matter consisting of a mixture of cellulose and acyl cellulose in a mixture of tertiary bases and quaternary ammonium halides obtained by addition of a halogen hydracid ester of an alcohol containing not more than 8 carbon atoms to a tertiary base of the pyridine series.

10. A composition of matter consisting of a mixture of cellulose and acyl cellulose in a mixture of tertiary bases and quaternary ammonium halides obtained by addition of a halogen hydracid ester of an alcohol containing not more than 8 carbon atoms to a technical mixture of tertiary pyridine bases.

11. A composition of matter consisting of acyl cellulose in a mixture of tertiary bases of the pyridine series and quaternary ammonium halides obtained by addition of a halogen hydracid ester of an alcohol containing not more than 8 carbon atoms to a tertiary base of the pyridine series.

12. A composition of matter consisting of acetyl cellulose in a mixture of tertiary bases of the pyridine series and quaternary ammonium halides obtained by addition of a halogen hydracid ester of an alcohol containing not more than 8 carbon atoms to a tertiary base of the pyridine series.

13. A composition of matter consisting of butyryl cellulose in a mixture of tertiary bases of the pyridine series and quaternary ammonium halides obtained by addition of a halogen hydracid ester of an alcohol containing not more than 8 carbon atoms to a tertiary base of the pyridine series.

14. A composition of matter consisting of benzoyl cellulose in a mixture of tertiary bases of the pyridine series and quaternary ammonium halides obtained by addition of a halogen hydracid ester of an alcohol containing not more than 8 carbon atoms to a tertiary base of the pyridine series.

CHARLES GRAENACHER.